United States Patent
Ruhnau

(10) Patent No.: US 7,996,136 B2
(45) Date of Patent: Aug. 9, 2011

(54) BRAKE PERFORMANCE MONITORING SYSTEM AND METHOD

(75) Inventor: Gerhard Ruhnau, Neustadt (DE)

(73) Assignee: WABCO GmbH, Hannover (DE)

( * ) Notice: Subject to any disclaimer, the term of this patent is extended or adjusted under 35 U.S.C. 154(b) by 593 days.

(21) Appl. No.: 11/659,164

(22) PCT Filed: Jul. 26, 2005

(86) PCT No.: PCT/EP2005/008089
§ 371 (c)(1),
(2), (4) Date: Feb. 1, 2007

(87) PCT Pub. No.: WO2006/018098
PCT Pub. Date: Feb. 23, 2006

(65) Prior Publication Data
US 2007/0244612 A1   Oct. 18, 2007

(30) Foreign Application Priority Data

Aug. 12, 2004 (DE) .......................... 10 2004 039 151

(51) Int. Cl.
*G06F 19/00* (2011.01)
*G06F 7/70* (2006.01)
*G06G 7/00* (2006.01)
*G06G 7/76* (2006.01)

(52) U.S. Cl. ............... 701/70; 701/29; 701/74; 180/271

(58) Field of Classification Search .................... 701/29, 701/31, 35, 36, 70–92; 180/197, 244, 271, 180/275, 306, 325, 333, 370; 477/182–218
See application file for complete search history.

(56) References Cited

U.S. PATENT DOCUMENTS

| 3,651,690 A | 3/1972 | Pagdin et al. |
| 3,690,165 A * | 9/1972 | Sturmo et al. ............. 73/116.06 |
| 4,665,491 A * | 5/1987 | Kubo .............................. 701/79 |
| 5,586,953 A * | 12/1996 | Abo ................................ 477/47 |
| 6,289,272 B1 * | 9/2001 | Batistic et al. ................. 701/72 |
| 6,299,261 B1 * | 10/2001 | Weiberle et al. .............. 303/20 |
| 6,577,942 B1 | 6/2003 | Moore |
| 6,659,233 B2 * | 12/2003 | DeVlieg ................... 188/1.11 E |
| 6,799,129 B2 * | 9/2004 | Schmidt et al. ................ 702/73 |
| 7,407,235 B2 * | 8/2008 | Schmidt et al. .............. 303/139 |
| 7,483,794 B2 * | 1/2009 | Bocquillon et al. ........... 702/34 |

(Continued)

FOREIGN PATENT DOCUMENTS

DE    26 42 776    3/1978

(Continued)

OTHER PUBLICATIONS

Abstract English Translation of RU 2180630C2.*

*Primary Examiner* — Jack Keith
*Assistant Examiner* — Rami Khatib
(74) *Attorney, Agent, or Firm* — Kramer Levin Naftalis & Frankel LLP

(57) ABSTRACT

A system and method for monitoring brake performance, in particular, in motor vehicles, are provided. The braking distances specific to each vehicle wheel are determined and compared using an electronic control unit. If a wheel exhibits a longer than average braking distance, insufficient braking is identified and is displayed by means of a display device.

34 Claims, 6 Drawing Sheets

U.S. PATENT DOCUMENTS

| | | |
|---|---|---|
| 7,484,599 B2 * | 2/2009 | DeVlieg .................. 188/1.11 L |
| 2002/0157461 A1 * | 10/2002 | Schmidt et al. ................. 73/146 |
| 2006/0022518 A1 * | 2/2006 | Manaka et al. ............... 303/122 |
| 2007/0150134 A1 * | 6/2007 | Yamamoto ..................... 701/30 |

FOREIGN PATENT DOCUMENTS

| | | |
|---|---|---|
| DE | 41 17 534 A1 | 12/1992 |
| DE | 197 55 112 A1 | 6/1998 |
| DE | 101 52 590 A1 | 10/2002 |
| DE | 101 39 102 A1 | 3/2003 |
| DE | 101 56 607 A1 | 5/2003 |
| EP | 0 508 146 A2 | 10/1992 |
| EP | 1 092 967 A2 | 4/2001 |
| JP | 10236292 A * | 9/1998 |
| RU | 2180630 C2 * | 3/2002 |

* cited by examiner

BRAKE PERFORMANCE MONITORING SYSTEM AND METHOD

BACKGROUND OF THE INVENTION

The present invention relates to a system and method for monitoring brake performance in a vehicle.

Several methods for testing or monitoring brake performance in motor vehicles are known. Such conventional methods are used to indicate to the vehicle operator whether one wheel or individual wheels of the vehicle are being braked too lightly in a defective manner or are otherwise performing poorly (due to glazed or worn brake linings or brake overheating (fading), for example). Without brake performance monitoring, undesirable reduction in overall braking capability would remain largely unnoticed by the operator. Thus, any necessary repair of the defective brakes would be left undone or unnecessarily delayed.

For example, DE 101 39 102 A1 describes a method and device for monitoring the functional capability of a vehicle brake. For this purpose, the difference between the speeds of rotation of the left and right wheels of one axle is evaluated or compared during a braking operation on a straight road. A wheel with higher speed of rotation is considered to be faulty if the difference in speed of rotation exceeds a predetermined threshold. A disadvantage of this method is that the wheel speeds of rotation fluctuate within certain limits due to road influences, such as different coefficients of friction on the left and right, and also cannot be measured with selectively high accuracy. For this reason, the measured result can sometimes be unusable because of external interference.

DE 197 55 112 A1 describes a method and monitoring device for detecting a decline in braking effect of a motor vehicle brake. Brake actuation by the operator or the travel of the brake pedal is compared against the vehicle deceleration achieved thereby. Should the measured vehicle deceleration not correspond to the brake actuation, or in other words be too small, an inadequate effect of the vehicle brakes can be inferred therefrom. A disadvantage of this known method is, in particular, that many other unknown influencing variables, such as engine braking torque, air drag and rolling friction, also act on vehicle deceleration. Furthermore, the underbraked wheel cannot be directly identified. Thus, this method also cannot be regarded as particularly accurate.

U.S. Pat. No. 6,577,942 B1 describes a method for recognizing brake problems based on an evaluation of small variations in wheel slip. The wheel slips of the wheels are measured during a braking operation. The slip values are then compared against slip values from a previous braking operation or current slip values of other wheels. If a relatively large deviation is revealed by this comparison, an alarm is delivered to the operator. A disadvantage of this known method is that accurate measurement of wheel slips also requires that an exact vehicle reference speed be known. Using known means (wheel speed sensors), however, such a speed cannot be determined with the necessary high accuracy during operation of the service brakes, since brake slip causes the wheel speeds in this case to be smaller than the true vehicle speed. This known method is therefore also not excessively accurate.

According to another conventional method described in DE 101 56 607 A1, it is determined by comparison whether a current braking operation is just as effective as a comparable previous braking operation. If the comparison indicates that the current braking operation is less effective, or in other words that the vehicle is being braked less heavily, it is inferred therefrom that the brakes have deteriorated. This known method is suitable, in particular, for temporary, relatively large impairments of the braking effect due to fading (decline of the braking effect due to overheating of the brakes). It also is not overly accurate.

Continuous brake-lining wear of a brake can also be recognized with special wear sensors known to those skilled in the art. However, the use of such sensors represents an undesirable increased cost expenditure.

Also, a wheel braked inadequately by a defective or worn brake can be identified under stationary conditions on a brake test bench.

SUMMARY OF THE INVENTION

Generally speaking, in accordance with the present invention, a new system and method for monitoring vehicle brake performance are provided that overcome disadvantages associated with conventional systems and methods.

The braking distances specific to each individual vehicle wheel are summed and compared over a relatively long travel distance. Distance counts have been used conventionally for a very different purpose—namely, tire-pressure monitoring (see DE-A1 101 52 590). If a wheel exhibits a longer than average braking distance, insufficient braking is identified and is displayed by means of a display device.

The present invention advantageously provides precise and timely recognition, and communication to the vehicle operator, of an inadequately braked vehicle wheel. As a result, the vehicle operator can adjust his/her driving style based on the malfunction and arrange for any necessary repair.

The present invention is cost-effective, since there is no need for separate wear sensors. Instead, signals of standard wheel speed sensors are evaluated, which sensors are already present for other purposes, such as for an anti brake-lock system (ABS). By means of an appropriate program expansion, the already present electronic unit of an ABS can also be jointly exploited.

It is thus an object of the present invention to provide a cost-effective system and method for brake performance monitoring, by which it is possible to recognize, while the vehicle is in motion, inadequate braking of one or more vehicle wheels, and to do so with increased accuracy and reliability.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangements of parts which are adapted to effect such steps, all as exemplified in the constructions herein set forth, and the scope of the invention will be indicated in the claims.

BRIEF DESCRIPTION OF THE DRAWINGS

The present invention will be described in greater detail hereinafter on the basis of the accompanying drawings, wherein.

DETAILED DESCRIPTION OF THE PREFERRED EMBODIMENTS

Figure 1:
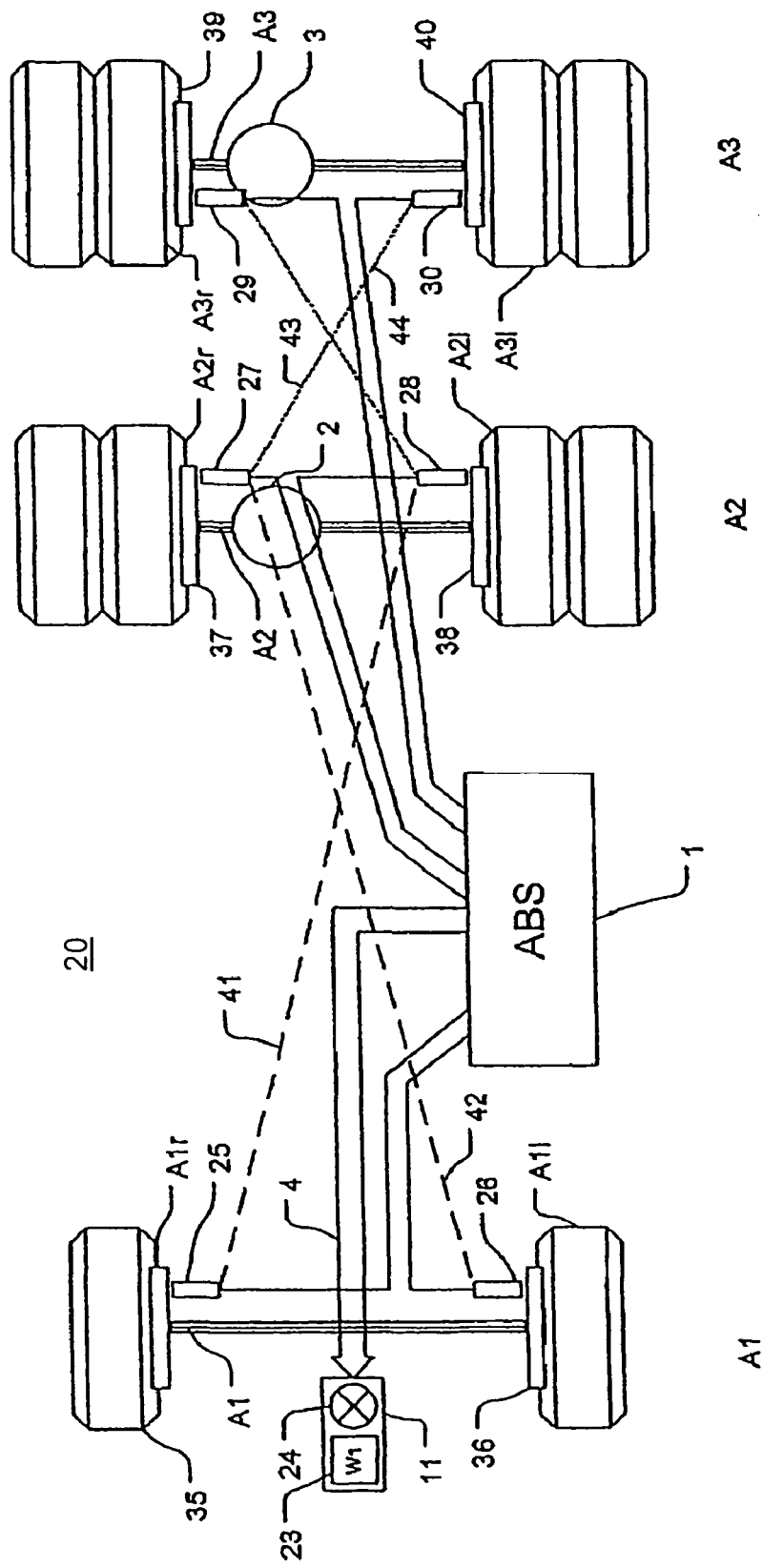
FIG. 1 is a schematic diagram depicting the brake system of a truck having a front axle and two rear axles.

Referring now to the drawing figures, FIG. 1 schematically shows the running gear (20) of a commercial vehicle or truck with a front axle (A1) and two rear axles (A2, A3). However, it should be understood that the present invention is also applicable to a vehicle having only two axles, for example.

The wheels of the two rear axles are equipped with dual sets of tires. Each rear axle is equipped with its own differential (2, 3) for driving the wheels thereof. However, it should be understood that the present invention can also be applied to vehicles with different running gears, such as those with only two axles, for example.

Running gear (20) has six wheels in total (A1r, A1l, A2r, A2l, A3r and A3l). Each of these wheels is provided with a wheel speed sensor (25, 26, 27, 28, 29, 30).

Wheel speed sensors (25 to 30) can be of conventional type. They sample the rotation of an oppositely disposed, toothed pole wheel (35, 36, 37, 38, 39, 40) fixed on the wheel. Such a pole wheel can be provided with 100 teeth, for example. The distance that a wheel of standard size or that a vehicle must travel for passage of one tooth is typically approximately 3 cm.

During movement of a tooth of the pole wheel past a wheel speed sensor, a sinusoidal voltage signal is induced in a coil of the sensor equipped with a permanent magnet. The wheel speed sensors (35 to 40) are connected by lines to an electronic unit (1) including at least an ABS for evaluation of the wheel speed signals.

The ABS controls the wheel brakes of the vehicle (in this case, a truck) during an excessively heavy braking maneuver on a smooth road, with the effect of reducing the brake pressure and thus preventing wheel lock. For this purpose, the ABS is connected to solenoid valves (not shown) for admission of pressurized fluid to the wheel brakes.

Electronic unit (1) is further connected via a CAN bus (4) to further electronic units (not shown) in the vehicle. Also connected to the bus (4) is an indicator device (11), which, as explained in more detail hereinafter, serves to indicate one or more wheels that exhibit inadequate brake performance.

Figure 4:
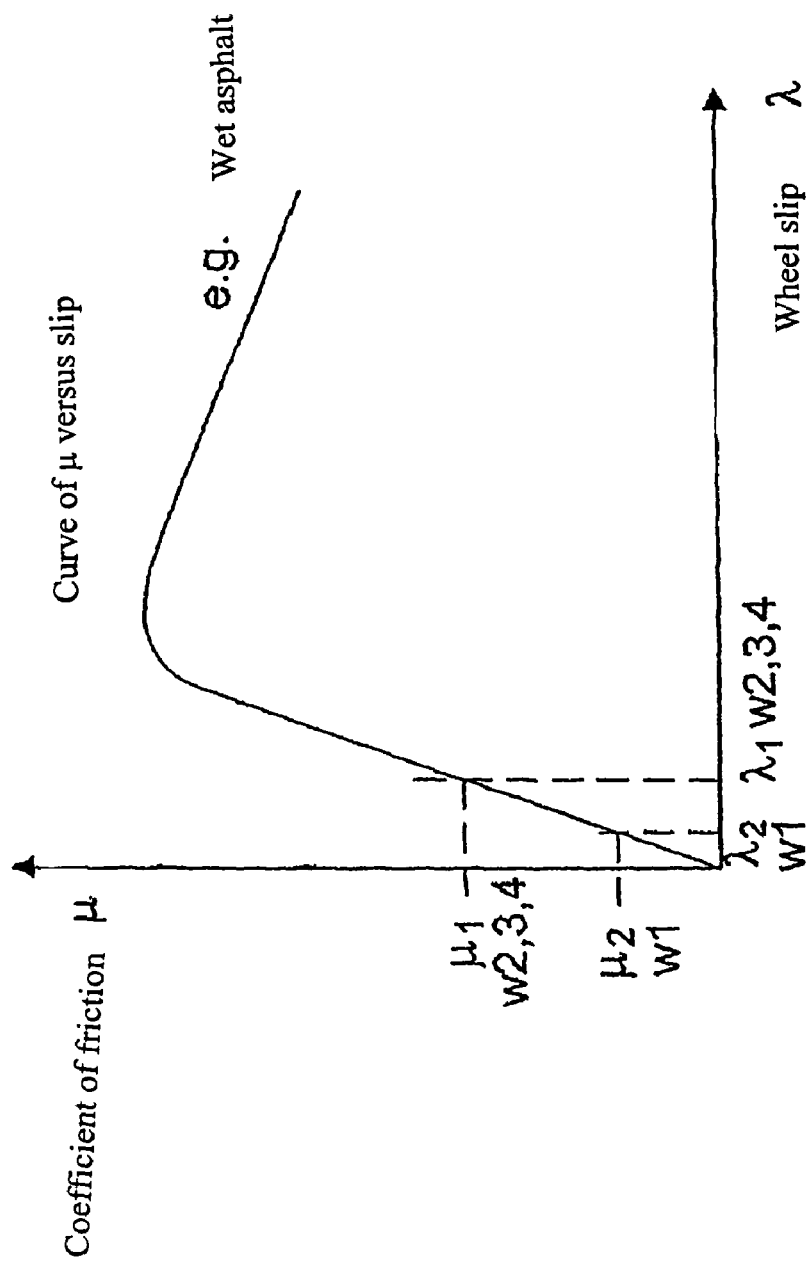
FIG. 4 is a graphical representation of tire coefficients of friction of four vehicle tires versus tire slip.

FIG. 4 shows the curve of μ versus slip of a rubber-tired vehicle wheel running on wet asphalt, for example. In the unbraked condition, the friction coefficient μ is equal to zero and the wheel slip λ is also equal to zero. The coefficient μ then increases approximately linearly to a maximum, which is reached at a wheel slip of approximately 20%. Thereafter, the wheel enters an unstable range, in which the friction coefficient μ decreases again, until it assumes a minimal value at a slip of 100%.

During operation of the service brakes, the wheels of the vehicle are located on the rising, stable branch of the curve of μ versus slip. For a given vehicle, which is precisely in a phase of operation of the service brakes, three wheels (w2, w3, w4) are running with a friction coefficient μ1 and a slip λ1. A fourth wheel (w1), however, is running with a different friction coefficient μ1 and wheel slip λ2. As can be seen, the deviating wheel w1 is located on a lower point of the curve of μ versus slip, and, thus, is being braked less heavily than the other wheels. Since this deviating wheel exhibits a smaller slip than the other wheels, however, this means that it is also running at a higher wheel speed and, therefore, is performing more revolutions over a relatively long travel distance. This larger number of revolutions compared with the other wheels during the braked phases is exploited by the present invention.

Figure 3:
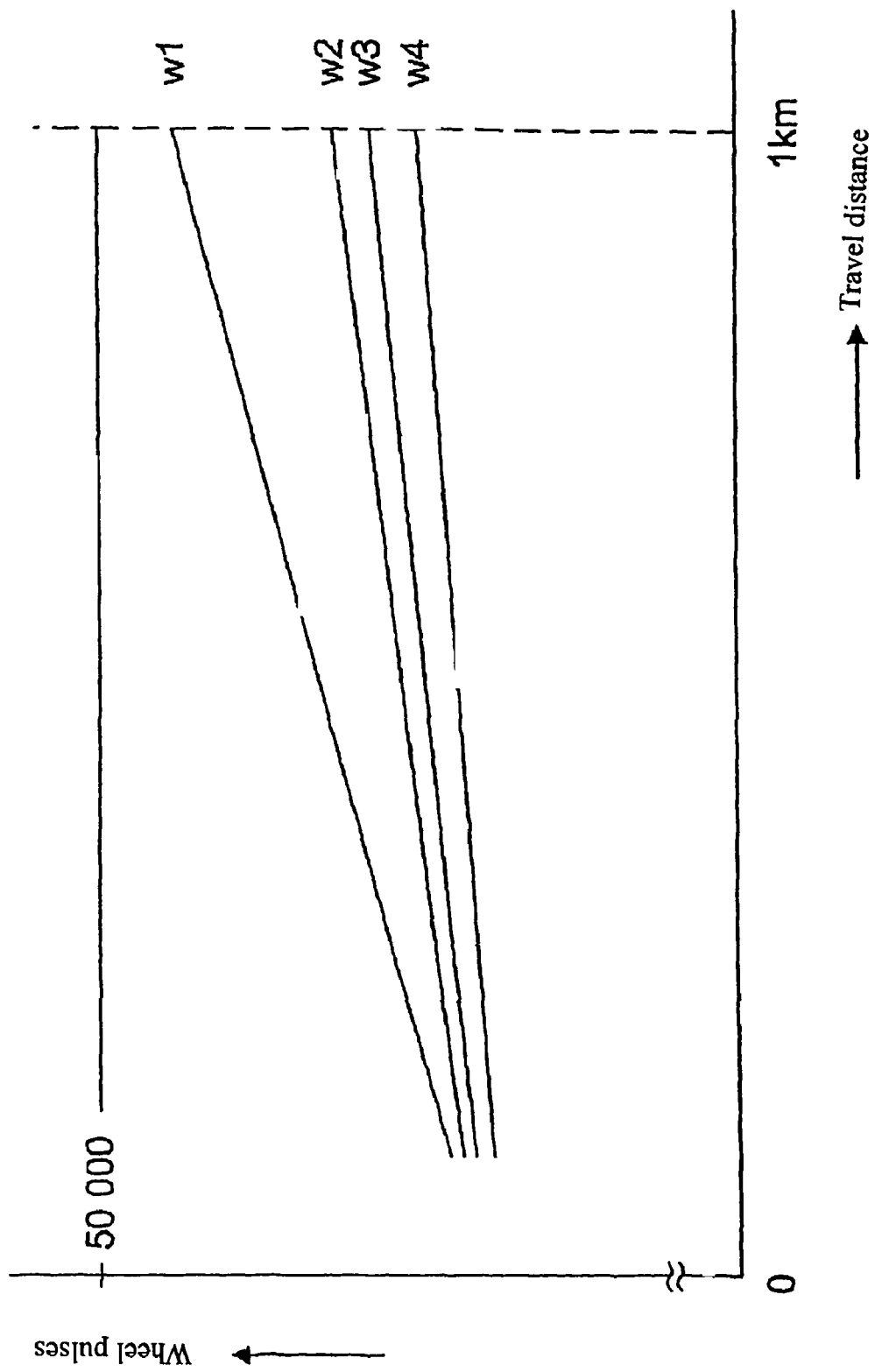
FIG. 3 is a graphical representation of the summing of the measured wheel-speed pulses of four vehicle wheels over a travel distance of 1 km in accordance with an embodiment of the present invention.

As is evident from FIG. 3, in accordance with the present invention, the wheel pulses generated by the wheel speed sensors during the braked phases of the vehicle are summed over a specified travel distance, in this case 1 km, for example. The number of wheel pulses is proportional to the wheel revolutions. As can be seen, the count results (sums) of three wheels (w2, w3, w4) are close to one another in a narrow range of values. Only wheel w1 deviates significantly from this and exhibits a higher count result. As a result, as will be explained in greater detail hereinafter, it can be recognized by the evaluating electronic unit (1) that this wheel (w1) is inadequately braked and, therefore, the associated brake cannot be in proper condition. The measured deviation or the accuracy of the measurement increases with the length of the measuring distance.

In the example depicted in FIG. 3, the count results of all wheels remain under a maximum memory value of 50,000 pulses. This value can represent, for example, the sum of the wheel pulses of an unbraked wheel over the travel distance (e.g., 1 km).

The type of evaluation of the wheel pulses within electronic unit (1) will be explained on the basis of FIG. 2. On the left, the schematic block diagram shows the six wheel speed sensors (25 to 30) of FIG. 1. These are connected to the electronic unit (1), which can also contain an ABS and, if necessary, other electronic units (not shown).

As discussed above, the wheel speed sensors deliver sinusoidal output signals. These are first converted to individual pulses and counted in input circuits (5, 6, 7, 8, 9, 10) containing pulse shapers and counters (C). During each sine period, two pulses are generated, usually when the sinusoidal oscillation passes through zero. Such input circuits are known to those skilled in the art.

By means of an activation circuit (21) described in more detail hereinafter, the counting operation can be started (at the beginning of braking) and stopped (at the end of braking) in all input circuits (C) (5 to 10) simultaneously. In this way, the count results corresponding to the accumulated wheel revolutions for a specified total braking distance are available for each individual wheel in the input circuits (5 to 10).

The sums generated in this way for the wheel pulses of the individual wheels are then supplied to adding means (A) (12, 13, 14, 15). The accumulated wheel pulses of the diagonally opposite wheels (A1r and A2l) (diagonal (41) in FIG. 1) are supplied to adding means (12). The pulses of the further diagonally opposite wheels (A1l and A2r) (diagonal (42) in FIG. 1) are supplied to adding means (13).

Thus, the two adding means (12 and 13) form the sums of the sensor pulses of the respective diagonally opposite wheels of the front axle (A1) and of the first rear axle (A2). This diagonal summation is indicated in FIG. 1 by two dashed diagonals (41, 42).

Correspondingly, the further adding means (14 and 15) evaluate the sums of the wheel pulses of the diagonally opposite wheels (A2l, A3r) (diagonal (44)) and (A2r, A3l) (diagonal (43)). The wheels belong to the two rear axles A2 and A3 of the running gear (20). The diagonal summation of the wheel pulses of the two rear axles is shown in FIG. 1, in this case as two dotted diagonals (43, 44).

In each of the four adding means (A) (12 to 15), therefore, individual wheel-pulse sums are summed for the respective two connected, diagonally opposite wheels. As discussed above, however, the summation takes place by appropriate activation of the counters (C) (5 to 10) only for the braked phases of the vehicle.

Recognition of these braking phases as well as recognition of further preconditions for summation of sensor pulses takes place in an activation circuit (21). The function of this circuit will be explained in greater detail hereinafter. The activation circuit (21) is connected via a line (22) to the counters (5 to 10), and so it can communicate thereto the beginning and end of the respective counting and comparison phases.

The four diagonal sums calculated in this way by the adding means (A) (12 to 15) for wheel pulses of a predetermined overall braking distance are then subtracted from one another in pairs in comparing means (16, 17), and, in this way, the respective deviations between the associated diagonals are detected. These are supplied to threshold modules (18, 19).

If the calculated difference or deviation between the diagonals exceeds a predefined threshold, it means that a relevant deviation exists between the respective two diagonals, and thus the brake of one wheel of one of these diagonals, specifically that with the higher count result, must be faulty. This information is then supplied to the indicator device (11) for indication of the faulty brakes, by which the vehicle operator is warned and can adapt his/her driving style to the malfunction. The indicator device (11) can display the reference number (23) of the faulty wheel and additionally be provided with a warning light (24).

As is standard in motor vehicle electronic units, indicated errors can be additionally stored in an error memory (not illustrated) for subsequent evaluation.

Figure 2:
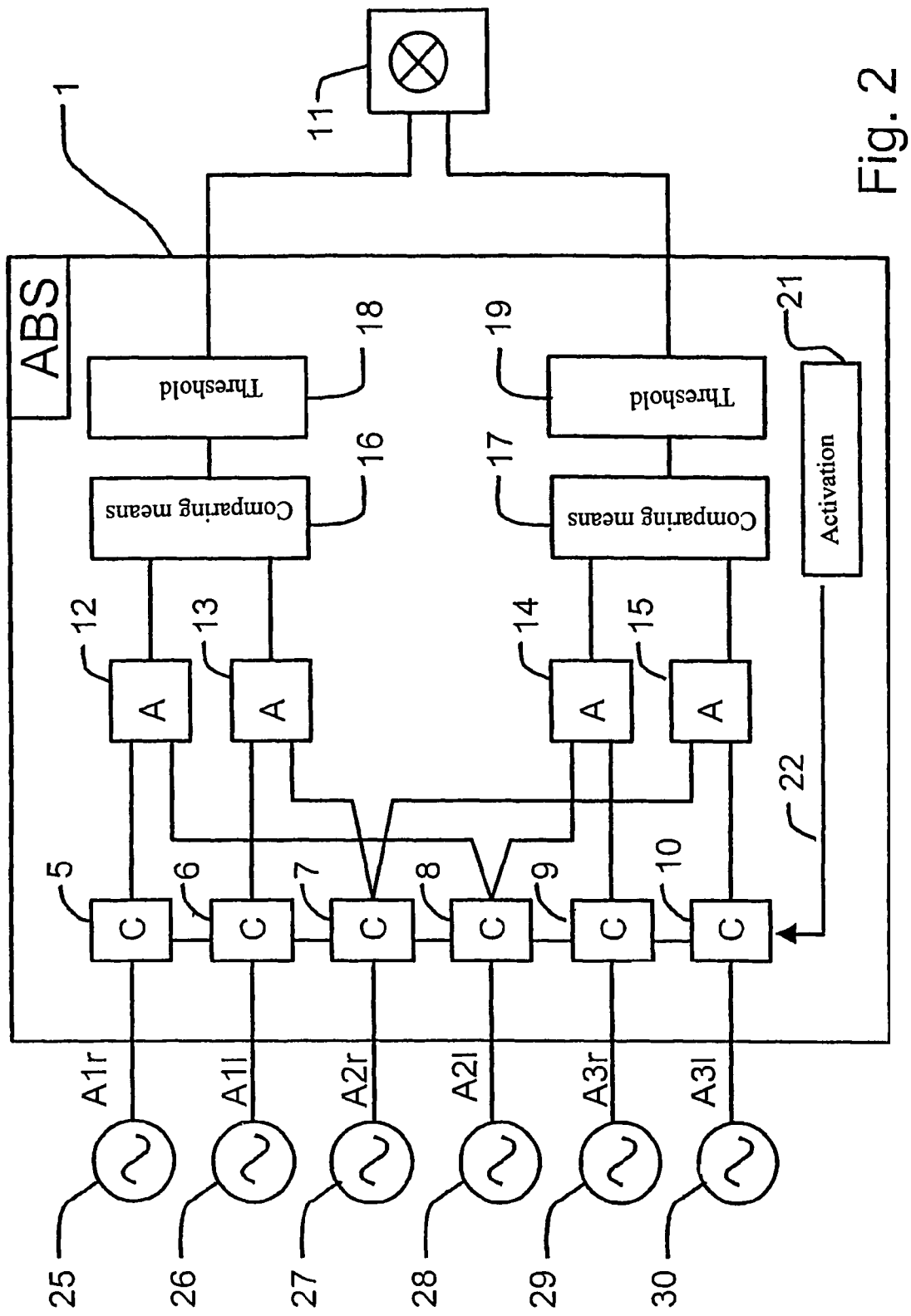
FIGS. 2, 2a and 2b are schematic diagrams depicting embodiments of an electronic control unit for effecting vehicle brake performance monitoring in accordance with the present invention.

The circuit depicted in FIG. 2 is to be understood merely as a schematic circuit example. It may be implemented partly or even completely by software, or in other words as an expansion of the programming in a vehicle control unit.

From the diagonals recognized to be faulty as described above, the faulty individual wheel can be identified by the fact that the wheel having the higher wheel-pulse sum of the diagonals at the end of the count distance is recognized as faulty from the count results of the counters (5 to 10). However, other methods of identification are also possible.

As described above, counting of the sensor pulses can take place over a braked total travel distance of approximately 1 km, for example, before an evaluation is made. This braked total travel distance is understood to be the sum of the individual distances over which braking takes place under specified conditions. In this connection, the exact length of the travel distance is not critical. The count results become more accurate as the travel distance becomes longer. The only criterion is that counting of the wheel pulses of all wheels be started at the same time at the beginning of the individual travel distances and be stopped at the same time at the end of the travel distances. Thereafter, the count result is evaluated and the counter content deleted. At this point a new count can be initiated.

Instead of counting for a specified travel distance, counting can be continued until one of the counters (5 to 10, 12 to 15) being used overflows.

Expediently, counting or summing takes place only during specified braking operations. These braking operations, discussed below, are recognized or selected by activation circuit (21).

The selected braking operations are firstly such braking operations in which the brake force or the vehicle deceleration lies between a minimum and a maximum value.

The minimum value is to be chosen such that any variations due to hysteresis and air gaps of the brakes due to brake actuation have already safely ceased, meaning that well defined braking now exists.

The maximum value is based on the fact that braking operations with instabilities that are already close to the maximum of the curve of $\mu$ versus slip (see FIG. 4) will be precluded by the evaluation. Thus, the evaluation is limited to pure operations of the service brakes.

Furthermore, counting of the sensor pulses is expediently suspended on tight curves, since these can falsify the result. This is justified by the fact that the wheels are known to run on different radii on tight curves.

In the case of curves with large radii, on the other hand, the wheels on the inside of the curve run on approximately the same radii as the wheels on the outside of the curve. Counting in wide curves is therefore permitted, since in these cases the falsifying influence is reduced by the diagonal summation of the sensor pulses of diagonally opposite wheels.

Furthermore, counting is also suspended expediently at high lateral accelerations of the vehicle. For example, lateral accelerations exceeding 0.1 g are considered to be high. Such lateral accelerations can be determined in known manner with an autonomous lateral-acceleration sensor or by means of an existing cornering-recognition means via the speed difference that then occurs between the left and right wheels of one axle during unbraked travel.

Expediently, counting is also suspended during braking operations with regulating vehicle systems, such as an ABS, an automatic traction control system (ATC) or a stability control system (SC). During such control operations, it is entirely possible that the wheels will no longer be in the stable region of the curve of $\mu$ versus slip (see FIG. 4), which is nevertheless a prerequisite for application of the present invention.

Particularly, in the case of stability control operations, sometimes only individual wheels are braked. This would falsify the measurements of braking distance in accordance with the present invention.

Furthermore, it is also expedient to suspend counting during braking operations with the engine coupled, because large and rapid fluctuations of engine torque may then be possible. Such fluctuations can temporarily cause greater slip of the wheels of the drive axles, thus also falsifying the count result.

Finally, it is expedient to calibrate the vehicle tires before executing the present invention. This operation of tire calibration is known to those skilled in the art (see e.g., EP 0 508 146 A2), and it serves to even out the falsifying influence of diameter deviations of individual wheels on the count result. For this purpose, the manufacturing-related and loading-dependent rolling differences of the tires are determined during a first unbraked travel distance. The measured differences can then be taken into account in evaluation of the individual braking distances.

Figure 2A:
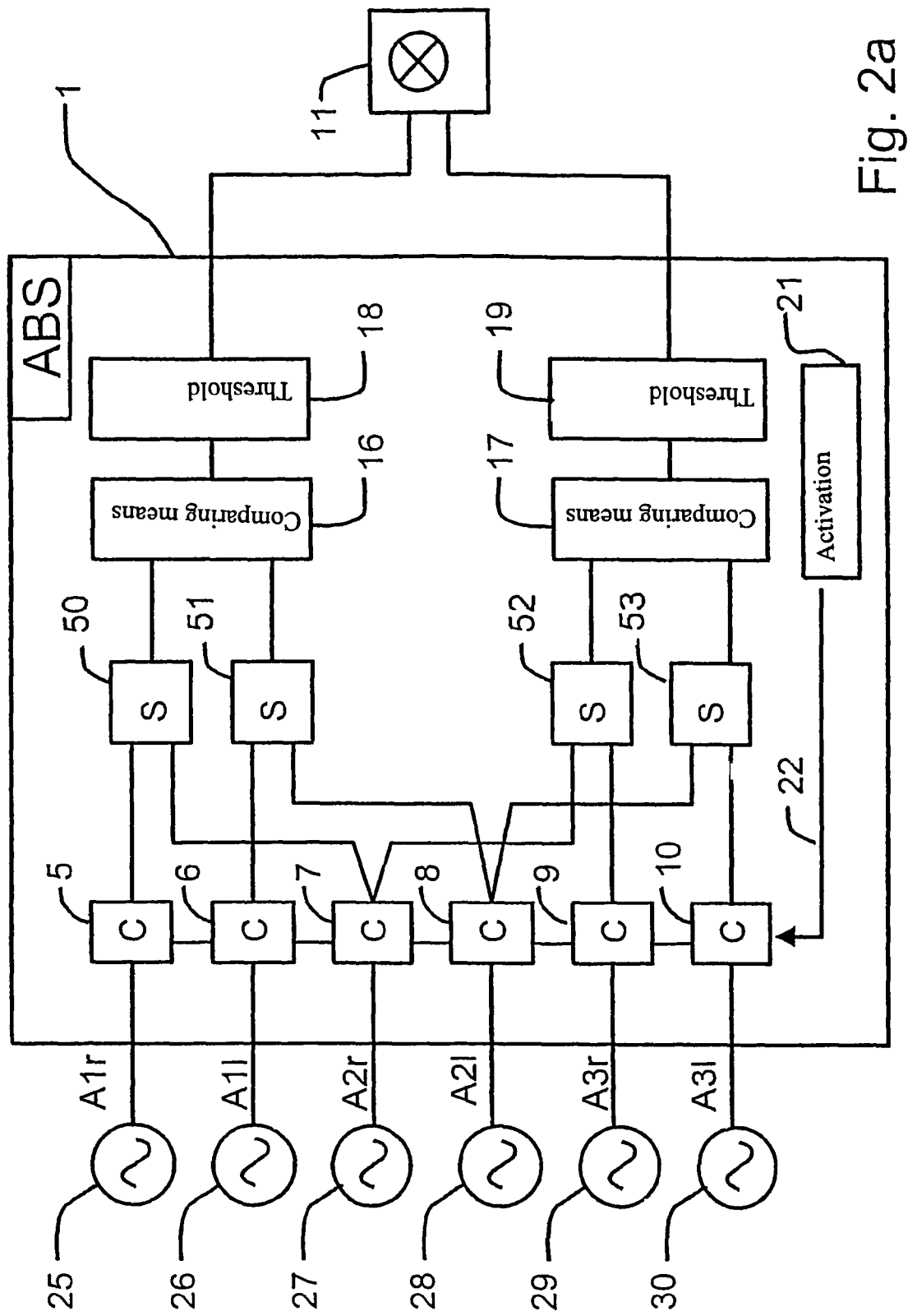

FIG. 2a shows a variation of the circuit of FIG. 2. Instead of the diagonal summation discussed above in connection with FIG. 2, differences of the wheel pulses of each side are formed in this case. For this purpose, there are provided, instead of adding means (A) (12 to 15), subtracting means (S) (50, 51, 52, 53) which are connected to the counters (C) in a manner different from that of FIG. 2, as is shown in FIG. 2a.

Subtracting means (50) subtracts the accumulated pulses of wheels A1r and A2r, or, in other words, front right minus middle right. Subtracting means (51) subtracts the summed pulses of wheels A1l and A2l, or, in other words, front left minus middle left. Subtracting means (52) subtracts the summed pulses of wheels A2r and A3r, or, in other words, middle right minus rear right. Subtracting means (53) subtracts the summed pulses of wheels A2l and A3l, or, in other words, middle left minus rear left.

The difference values formed in this way for the travel distance counting of adjacent wheels on the same side must be zero or almost zero in the case of defect-free, uniform braking. A slight error is introduced in curves, in which case the trailing wheels on curves run with a slightly smaller radius than the leading wheels. To compensate for this effect, the difference values of the left and right sides can be additionally compared with one another.

The comparing means (16) connected to the two upper subtracting means (50, 51) compares or subtracts the respective differences of the two wheels of the right and left front sides of the vehicle. The comparing means (17) connected to the two lower subtracting means (52) and (53) compares or subtracts the differences of the two wheels of the right and left rear sides of the vehicle. The result must be zero or almost zero in the case of fault-free brakes.

If one of the two results of the comparison exceeds a predefined threshold, however, the corresponding threshold modules (18, 19) deliver a signal, which is communicated to the vehicle operator by the indicator device (11). The vehicle operator can recognize therefrom that individual brakes may be faulty.

Figure 2B:
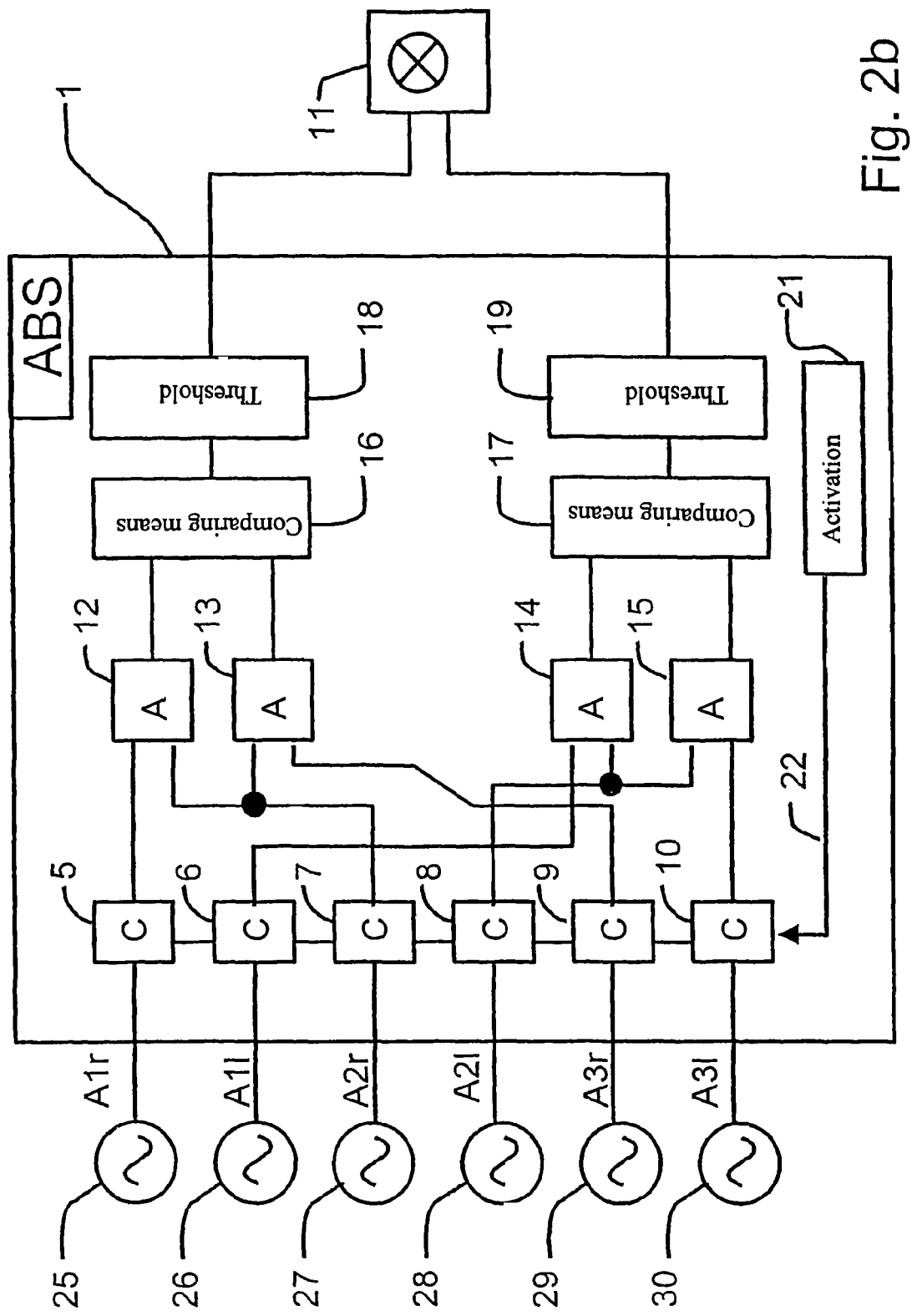

Referring now to FIG. 2b, the adding means (12 to 15) are interconnected in such a way that the wheel pulses of each two adjacent wheels on each side are added by the adding means (12 to 15). These are, therefore, the pulses of A1r and A2r, A2r and A3r, A1l and A2l, and A2l and A3l.

The connected comparing means (16, 17) then check whether these sums are equal on each side or whether small differences develop over the measuring distance. If they exceed a threshold (18, 19), a warning (11) is again output.

Since, as discussed above, the trailing wheels in a curve travel a slightly shorter distance, this method can be employed only in straight-aways or in curves with a large radius.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for monitoring brake performance in a vehicle having at least four wheels, at least two axles, and an ABS electronic control unit, the method comprising the steps of:
utilizing a program expansion of said ABS electronic control unit configured to determine at least one of sums and differences of braking distances of each wheel of said wheels having a wheel speed sensor, wherein said at least one of sums and differences of braking distances is determined only when said vehicle is braking in at least one preselected vehicle braking operation including predefined brake actuations with brake forces between a minimum and a maximum brake force;
comparing said at least one of sums and differences of braking distances of each wheel of said wheels having a wheel speed sensor with one another over a predefined travel distance; and
recognizing at least one wheel of said wheels having a braking distance of above-average length as being inadequately braked.

2. The method according to claim 1, wherein said predefined travel distance is approximately 1 km.

3. The method according to claim 1, wherein said predefined travel distance is determined by the overflow of a counter.

4. The method according to claim 1, wherein said preselected braking operation includes a minimum vehicle deceleration of approximately 0.1 g.

5. The method according to claim 1, wherein said preselected braking operation excludes braking operations in tight curves.

6. The method according to claim 1, wherein said preselected braking operation excludes braking operations with high lateral accelerations.

7. The method according to claim 6, wherein said high lateral accelerations are lateral accelerations greater than approximately 0.1 g.

8. The method according to claim 1, wherein said preselected braking operation excludes braking operations effected by a controlling vehicle system.

9. The method according to claim 8, wherein said controlling vehicle system includes at least one of an anti-brake lock system, an automatic traction control system and a stability control system.

10. The method according to claim 1, wherein said preselected braking operation excludes braking operations involving large fluctuations of engine torque.

11. The method according to claim 1, wherein said step of determining at least one of sums and differences of braking distances is effected by counting pulses generated by said wheel speed sensor.

12. The method according to claim 1, further comprising the steps of:
calculating sums of braking distances of diagonally opposite ones of said wheels; and
comparing said sums of braking distances of diagonally opposite ones of said wheels with one another.

13. The method according to claim 12, further comprising the step of generating an indication of said diagonally opposite ones of said wheels recognized as being inadequately braked.

14. The method according to claim 1, further comprising the step of generating an indication of each wheel of said wheels recognized as being inadequately braked.

15. The method according to claim 1, further comprising the steps of:
calculating differences of braking distances of adjacent ones of said wheels on each of sides of said vehicle; and
comparing said differences on one of said sides with said differences of an opposing one of said sides.

16. The method according to claim 1, further comprising the steps of:
calculating sums of braking distances of adjacent ones of said wheels on each of sides of said vehicle; and
comparing said sums with one another on a same one of said sides.

17. The method according to claim 1, further comprising the step of calibrating said wheels before effecting said step of determining at least one of sums and differences of braking distances of each wheel of said wheels having a wheel speed sensor.

18. A system for monitoring brake performance in a vehicle having at least four wheels and at least two axles, the system comprising:
    at least one sensor; and
    an ABS electronic control unit comprising an activation circuit configured to detect a preselected vehicle braking operation including predefined brake actuations having brake forces between a minimum and a maximum brake force based on output from said at least one sensor, and wherein said ABS electronic control unit is configured to:
        determine at least one of sums and differences of braking distances of each wheel of said wheels having a wheel speed sensor only during said preselected vehicle braking operation;
        compare said at least one of sums and differences of braking distances of said each wheel of said wheels with one another over a predefined travel distance; and
        recognize at least one wheel of said wheels having a braking distance of above-average length as being inadequately braked.

19. The system according to claim 18, wherein said predefined travel distance is approximately 1 km.

20. The system according to claim 18, wherein said ABS electronic control unit is further operative to count output signals from said wheel speed sensors.

21. The system according to claim 20, wherein said predefined travel distance is determined by the overflow of a counter associated with said ABS electronic control unit.

22. The system according to claim 18, wherein said preselected braking operation includes a minimum vehicle deceleration of approximately 0.1 g.

23. The system according to claim 18, wherein said preselected braking operation excludes braking operations in tight curves.

24. The system according to claim 18, wherein said preselected braking operation excludes braking operations with high lateral accelerations.

25. The system according to claim 24, wherein said high lateral accelerations are lateral accelerations greater than approximately 0.1 g.

26. The system according to claim 18, wherein said preselected braking operation excludes braking operations effected by a controlling vehicle system.

27. The system according to claim 26, wherein said controlling vehicle system includes at least one of an anti-brake lock system, an automatic traction control system and a stability control system.

28. The system according to claim 18, wherein said preselected braking operation excludes braking operations involving large fluctuations of engine torque.

29. The system according to claim 18, wherein said ABS electronic control unit is further configured to:
    calculate sums of braking distances of diagonally opposite ones of said wheels; and
    compare said sums of braking distances of diagonally opposite ones of said wheels with one another.

30. The system according to claim 29, wherein said ABS electronic control unit is further configured to generate an indication of said diagonally opposite ones of said wheels recognized as being inadequately braked.

31. The system according to claim 18, further comprising an indicator device for generating an indication of each wheel of said wheels recognized as being inadequately braked.

32. The system according to claim 18, wherein said ABS electronic control unit is further configured to:
    calculate differences of braking distances of adjacent ones of said wheels on each of sides of said vehicle; and
    compare said differences on one of said sides with said differences of an opposing one of said sides.

33. The system according to claim 18, wherein said ABS electronic control unit is further configured to:
    calculate sums of braking distances of adjacent ones of said wheels on each of sides of said vehicle; and
    compare said sums with one another on a same one of said sides.

34. The system according to claim 18, wherein said ABS electronic control unit is further operative to calibrate said wheels.

* * * * *